United States Patent
Wang et al.

(10) Patent No.: US 7,711,942 B2
(45) Date of Patent: May 4, 2010

(54) COMPUTER SECURITY SYSTEM AND METHOD

(75) Inventors: Lan Wang, Cypress, TX (US); Jennifer Rios, Spring, TX (US); Valiuddin Ali, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1146 days.

(21) Appl. No.: 10/947,717

(22) Filed: Sep. 23, 2004

(65) Prior Publication Data

US 2006/0064752 A1 Mar. 23, 2006

(51) Int. Cl.
*G06F 9/00* (2006.01)

(52) U.S. Cl. .................. 713/2; 726/19; 726/17

(58) Field of Classification Search .................. None
See application file for complete search history.

(56) References Cited

U.S. PATENT DOCUMENTS

| | | | |
|---|---|---|---|
| 5,844,986 A | 12/1998 | Davis | |
| 5,892,906 A | 4/1999 | Chou et al. | |
| 5,982,892 A | 11/1999 | Hicks et al. | |
| 6,535,976 B1 * | 3/2003 | Hoggarth et al. | 713/2 |
| 6,633,981 B1 | 10/2003 | Davis | |
| 6,647,498 B1 | 11/2003 | Cho | |
| 6,978,385 B1 * | 12/2005 | Cheston et al. | 726/18 |
| 7,107,460 B2 * | 9/2006 | Cromer et al. | 713/193 |
| 7,117,376 B2 * | 10/2006 | Grawrock | 380/277 |
| 2002/0087877 A1 | 7/2002 | Grawrock | |
| 2003/0084285 A1 | 5/2003 | Cromer et al. | |
| 2003/0159056 A1 | 8/2003 | Cromer et al. | |
| 2003/0221114 A1 | 11/2003 | Hino et al. | |
| 2004/0003288 A1 | 1/2004 | Wiseman et al. | |
| 2004/0073806 A1 | 4/2004 | Zimmer | |

FOREIGN PATENT DOCUMENTS

EP 0848315 11/1997

OTHER PUBLICATIONS

German Office Action corresponding to related German Patent Application No. 102005040073.6-53 dated Nov. 27, 2007, including English language translation.
Patent Office—Japan, Office Action dated Nov. 21, 2008, for Application No. 2005-266239; pp. 1-3.
Patent Office—China, Office Action dated Dec. 12, 2008, for Application No. 200510108940.3; pp. 1-4.
German Patent Office Action from co-pending German Patent Application No. 10 2005 040 073.6-53 having a mailed date of Nov. 28, 2008.
Examination Report under Section 18(3) from GB Patent Office, having a date of mailing of Jan. 9, 2009, in co-pending GB Patent Application No. GB0518575.6 with the applicant being Hewlett-Packard Development Company, L.P., and entitled Computer Security System and Method.

* cited by examiner

*Primary Examiner*—Pramila Parthasarathy

(57) ABSTRACT

A computer security system comprises a basic input/output system (BIOS) adapted to store a user key generated by a trusted platform module (TPM) for a user. The BIOS is also adapted to receive TPM authentication data from the user for initiating a boot process and interface with the TPM to request validation of the TPM authentication data by the TPM for initiating the boot process using the user key.

35 Claims, 2 Drawing Sheets

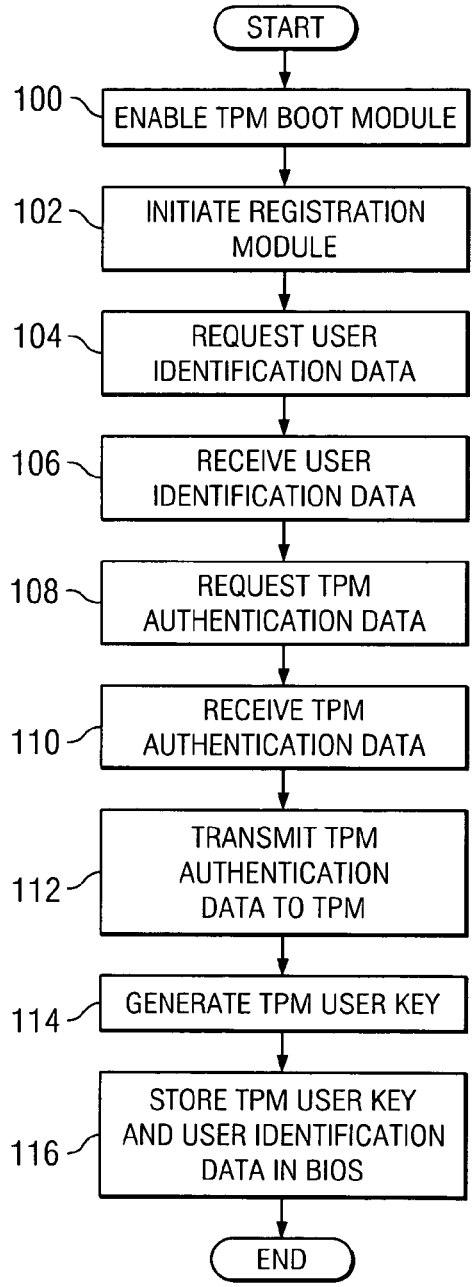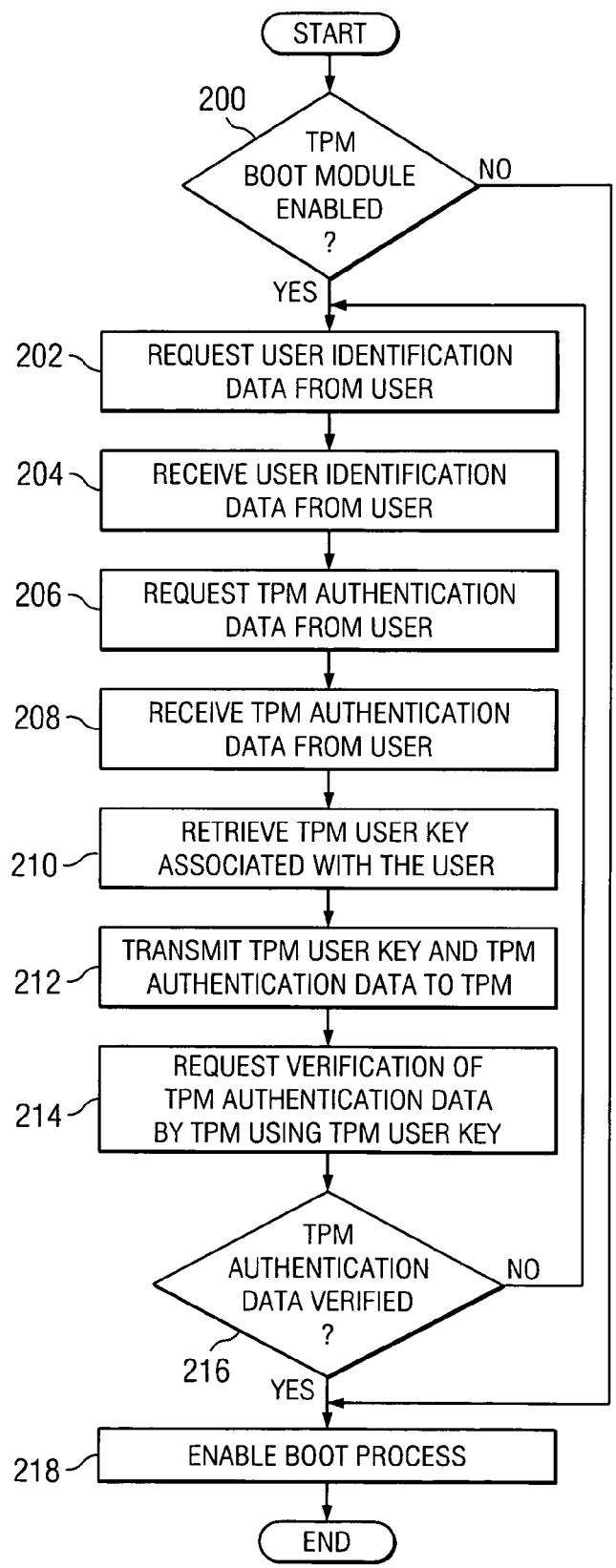

COMPUTER SECURITY SYSTEM AND METHOD

BACKGROUND

Computer systems generally function under the control or execution of an operating system (OS). Operating systems require a loading (i.e., "boot") process to load the OS into a computer memory. The boot process generally includes locating a basic input/output system (BIOS), loading the BIOS for execution, and passing control of the computer system to the BIOS. Thereafter, the BIOS loads the OS.

Various methods exist for securing or controlling the boot process of a computer system. For example, one such method includes the BIOS verifying a password provided by a user of the computer system with data stored in the BIOS. However, the BIOS remains susceptible to attack, thereby enabling unauthorized access to the boot password.

SUMMARY OF THE INVENTION

In accordance with one embodiment of the present invention, a computer security system comprises a basic input/output system (BIOS) adapted to store a user key generated by a trusted platform module (TPM) for a user. The BIOS is also adapted to receive TPM authentication data from the user for initiating a boot process and interface with the TPM to request validation of the TPM authentication data by the TPM for initiating the boot process using the user key.

In accordance with another embodiment of the present invention, a computer security method comprises storing a user key generated by a trusted platform module (TPM) corresponding to a user and receiving TPM authentication data from the user for initiating a boot process. The method also comprises requesting validation of the TPM authentication data by the TPM using the user key for initiating the boot process.

BRIEF DESCRIPTION OF THE DRAWINGS

For a more complete understanding of the present invention and the advantages thereof, reference is now made to the following descriptions taken in connection with the accompanying drawings in which:

FIG. 4 is a flow diagram illustrating an embodiment of a registration method using the computer security system of FIG. 1 in accordance with the present invention; and FIG. 5 is a flow diagram illustrating an embodiment of an authentication method using the computer security system of FIG. 1 in accordance with the present invention.

DETAILED DESCRIPTION OF THE DRAWINGS

The preferred embodiments of the present invention and the advantages thereof are best understood by referring to FIGS. 1-5 of the drawings, like numerals being used for like and corresponding parts of the various drawings.

Figure 1:
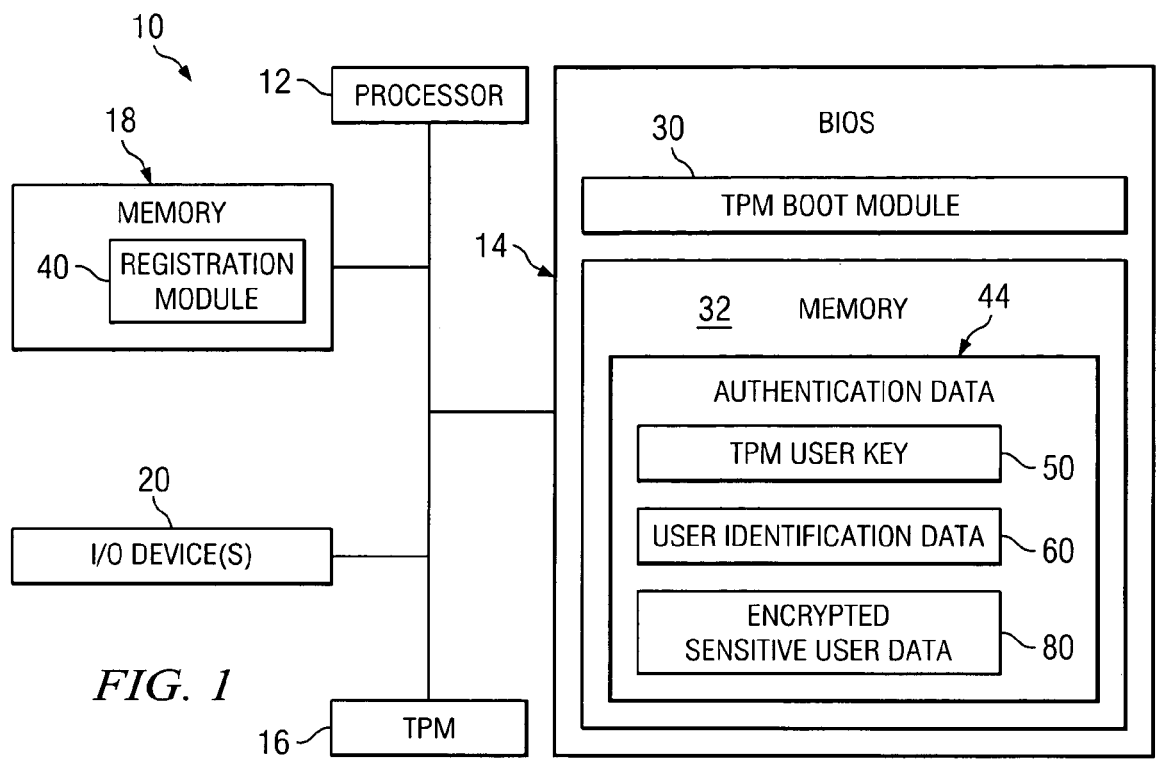
FIG. 1 is a diagram illustrating an embodiment of a computer security system in accordance with the present invention.

FIG. 1 is a diagram illustrating an embodiment of a computer security system 10 in accordance with the present invention. In the embodiment illustrated in FIG. 1, system 10 comprises a processor 12 communicatively coupled to a basic input/output system (BIOS) 14, a trusted platform module (TPM) 16, a memory 18, and input/output (I/O) device(s) 20. I/O device(s) 20 may comprise any type of device(s) for inputting information to system 10 or receiving an output of information from system 10 including, but not limited to, a keyboard, mouse, microphone, display, printer, or speaker. In the embodiment illustrated in FIG. 1, BIOS 14 comprises a TPM boot module 30 and a memory 32. TPM boot module 30 may comprise software, hardware, a combination of software and hardware. In some embodiments of the present invention, TPM boot module 30 cooperates with TPM 16 to provide a secure boot process for a computer system using cryptographic properties of TPM 16. However, it should be understood that other embodiments of the present invention may be configured to provide a secure boot process for other applications and/or devices (e.g., initiating or booting a software application or drive device). Additionally, it should be understood that system 10 may be implemented in any of a variety of types of computing devices or systems including, but not limited to, a personal or desktop computer, personal digital assistant (PDA), notebook or laptop computer, tablet, workstation, and server.

In the embodiment illustrated in FIG. 1, a registration module 40 is stored within memory 18 so as to be accessible and executable by processor 12. Registration module 40 may comprise software, hardware, or a combination of software and hardware. Registration module 40 may be implemented as part of an operating system or another application or platform. Further, registration module 40 may also be implemented as part of BIOS 14.

In some embodiments of the present invention, for example, a secure computer booting operation, in response to activation or enablement of TPM boot module 30, registration module 40 performs a registration operation to acquire information from a user of system 10 to enable a secure boot process using TPM 16. For example, in the embodiment illustrated in FIG. 1, memory 32 of BIOS 14 comprises authentication data 44 used by BIOS 14 and TPM 16 to control access to and/or initiation of secure computer resources, such as a secure computer boot process. In the embodiment illustrated in FIG. 1, authentication data 44 comprises user identification data 60 and a TPM user key 50. User identification data 60 comprises information associated with identifying a particular user of system 10 such as, but not limited to, a username, password, biometric, and/or a combination thereof. TPM user key 50 comprises information generated and/or interpretable by TPM 16, such as an opaque binary large object (BLOB).

Figure 2:
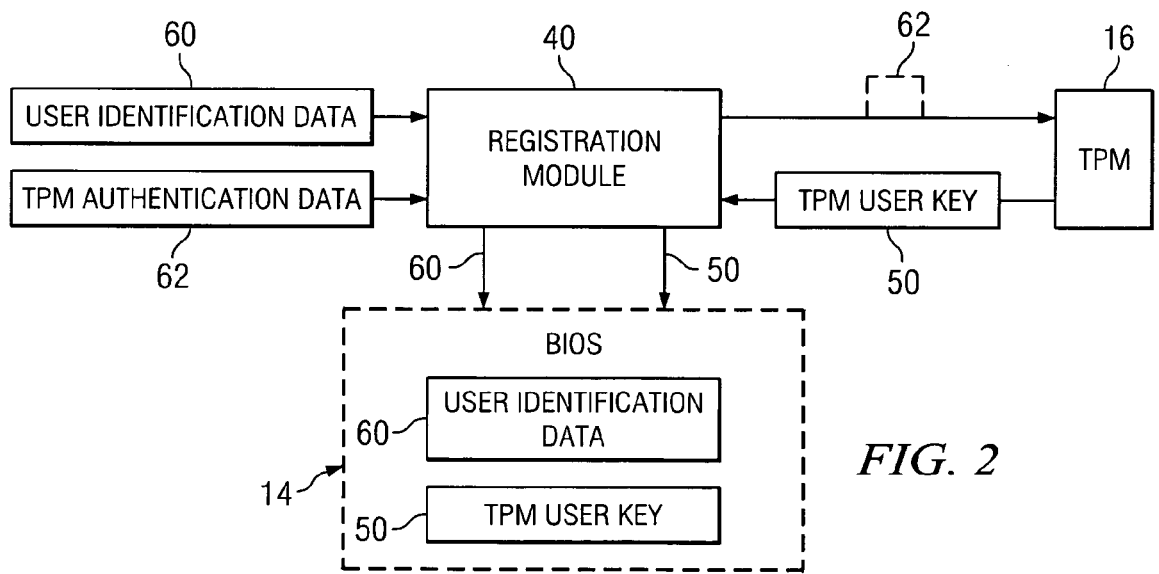
FIG. 2 is diagram illustrating an embodiment of a registration operation performed using the computer security system of FIG. 1.

FIG. 2 is a diagram illustrating an embodiment of a registration operation using system 10 in accordance with the present invention. In some embodiments of the present invention, the registration operation is performed to enable a subsequent secure booting operation. In operation, a user, system administrator, or other entity or policy activates or otherwise enables TPM boot module 30 to control a boot operation of a computer system using cryptographic properties of TPM 16. In response to enablement of TPM boot module 30, registration module 40 performs a user registration process by requesting or otherwise acquiring user identification data 60 and TPM authentication data 62 from the user. TPM authentication data 62 comprises information associated with accessing TPM 16 and/or otherwise verifying an identity of a user attempting to access or otherwise utilize TPM 16, such as, but not limited to, a TPM password. The registration process may be performed for a single user or multiple users (i.e., such as in a shared computing environment).

In the embodiment illustrated in FIG. 2, user identification data 60 and TPM authentication data 62 are requested from and/or otherwise received from a user by registration module 40. Registration module 40 transmits TPM authentication data 62 to TPM 16 and requests generation by TPM 16 of TPM user key 50 based on TPM authentication data 62. Registration module 40 receives TPM user key 50 from TPM 16 and transmits or otherwise causes the transfer of both TPM user key 50 and user identification data 62 to BIOS 14 for storage by BIOS 14.

Figure 3:
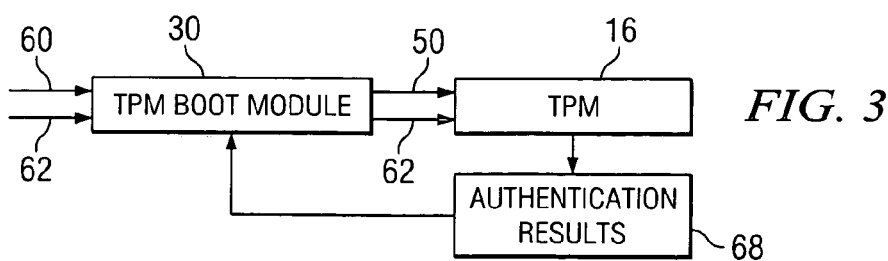
FIG. 3 is a diagram illustrating an embodiment of an authentication operation performed using the computer security system of FIG. 1.

FIG. 3 is a diagram illustrating an embodiment of a computer security authentication process using system 10 in accordance with the present invention. In the embodiment illustrated in FIG. 3, the authentication process is directed toward a secure computer booting operation. However, it should be understood that embodiments of the present invention may be otherwise configured to perform secure booting operations for other applications. In operation, during a subsequent boot process in response to activation or enablement of TPM boot module 30 and acquisition and/or creation of TPM user key 50, TPM boot module 30 requests and/or otherwise receives user identification data 60 and TPM authentication data 62 from a user. In the embodiment illustrated in FIG. 3, TPM authentication data 62 is not stored by system 10 during the registration process and, therefore, is provided by the user during the subsequent boot operation. For example, the user may provide TPM authentication data 62 during the subsequent boot operation via I/O device 20.

TPM boot module 30 receives TPM authentication data 62 from the user and identifies and/or otherwise retrieves TPM user key 50 associated with the user. For example, in some embodiments of the present invention, boot module 30 prompts or otherwise requests the user to provide user identification data 60 which boot module 30 uses to identify TPM user key 50 associated with the user. In other embodiments of the present invention, boot module 30 is configured to display a listing of available user identification data 60 for selection by the user such that the selected user identification data 60 is used by boot module 30 to identify TPM user key 50 associated with the user. TPM boot module 30 transmits or otherwise loads TPM user key 50 and TPM authentication data 62 received from the user to TPM 16 and requests verification of TPM authentication data 62 by TPM 16 using TPM user key 50. If TPM authentication data 62 corresponds to TPM user key 50, authentication results 68 yielding a positive verification or authentication are transmitted or otherwise forwarded to BIOS 14 to enable BIOS 14 to proceed with the boot process. If TPM authentication data 62 does not correspond to TPM user key 50, authentication results 68 indicating a negative verification or authentication are transmitted or otherwise forwarded to BIOS 14 such that BIOS 14 may repeat the boot authentication process or terminate the boot process.

FIG. 4 is a flow diagram illustrating an embodiment of a computer security registration method using system 10 in accordance with the present invention. The method begins at block 100, where TPM boot module 30 is enabled. At block 102, registration module 40 is initiated to perform a registration operation. At block 104, registration module 40 requests user identification data 60. At block 106, registration module 40 receives user identification data 60 from the user. At block 108, registration module 40 requests TPM authentication data 62 from the user. At block 110, registration module 40 receives TPM authentication data 62 from the user.

At block 112, registration module 40 transmits or otherwise causes TPM authentication data 62 to be communicated to TPM 16 and requests generation of TPM user key 50 by TPM 16 based on TPM authentication data 62. At block 114, TPM 16 generates TPM user key 50 based on the TPM authentication data 62. At block 116, registration module 40 sends to BIOS 14 or otherwise causes to be stored in BIOS 14 TPM user key 50 and user identification data 60.

FIG. 5 is a flow diagram illustrating an embodiment of a computer security authentication operation using system 10 in accordance with the present invention. In the embodiment illustrated in FIG. 7, the authentication operation is directed toward a secure computer booting operation; however, it should be understood that other secure application may be performed using system 10 in accordance with other embodiments of the present invention. The method begins at decisional block 200, where a determination is made whether TPM boot module 30 is enabled. If TPM boot module 30 is not enabled, the method proceeds to block 218, where BIOS 14 performs a boot process for a computer system. If TPM boot module 30 is enabled, the method proceeds from block 200 to block 202, where TPM boot module 30 requests user identification data 60 from the user. At block 204, TPM boot module 30 receives user identification data 60 from the user. At block 206, TPM boot module 30 requests TPM authentication data 62 from the user. At block 208, TPM boot module 30 receives TPM authentication data 62 from the user.

At block 210, TPM boot module 30 accesses or otherwise retrieves TPM user key 50 from memory 32 of BIOS 14 corresponding to the user identification data 60. At block 212, TPM boot module 30 transmits or otherwise communicates TPM user key 50 and TPM authentication data 62 to TPM 16. At block 214, TPM boot module 30 requests verification of TPM authentication data 62 by TPM 16 using TPM user key 50. At decisional block 216, a determination is made whether TPM authentication data 62 verification by TPM 16 is successful. If TPM authentication data 62 does not correspond to TPM user key 50, the method proceeds to block 202, where TPM boot module 30 may be configured to repeat the boot authentication process. If TPM authentication data 62 corresponds to TPM user key 50 or is otherwise verified by TPM 16, the method proceeds to block 218, where BIOS 14 continues or otherwise initiates the boot process.

Thus, embodiments of the present invention enable a secure boot process of a computer system using cryptographic properties of a trusted platform module (i.e., TPM 16). In some embodiments of the present invention, only encrypted information interpretable by the trusted platform module is stored by the computer system such that, during a boot operation, the trusted platform module decrypts the encrypted information using information provided by the user during the boot operation to authenticate the user and authorize continued booting processes for the computer system. It should also be understood that in the embodiments of the method of the present invention described in FIGS. 4 and 5, certain functions may be omitted, combined, or accomplished in a sequence different than depicted in FIGS. 4 and 5. Also, it should be understood that the methods depicted in FIGS. 4 and 5 may be altered to encompass any of the other features or aspects described elsewhere in the specification.

What is claimed is:

1. A computer security system, comprising:
   a trusted platform module (TPM) to at least generate a user key upon a request;
   a registration module to register users for performing a secure boot process using the TPM, the registration module configured to:

receive user identification data and TPM authentication data from a user;
request the TMP to generate a TPM user key using the TPM authentication data; and
store and associate the TPM user key with the user identification data;
a basic input/output system (BIOS) to receive subsequent user identification data and subsequent TPM authentication data from the user for initiating a boot process, the BIOS adapted to interface with the TPM to request validation of the subsequent TPM authentication data by verifying whether the subsequent TPM authentication data corresponds to the TPM user key; and
when the subsequent TPM authentication data corresponds to the TPM user key associated with the user, the BIOS allows the boot process to perform.

2. The system of claim 1, the BIOS configured to interface with the TPM to request generation of the TPM user key by the TPM.

3. The system of claim 1, the TPM configured to validate the subsequent TPM authentication data using the TPM user key and transmit verification to the BIOS.

4. The system of claim 1, the BIOS configured to request from the user the TPM authentication data.

5. The system of claim 1, the BIOS configured to perform a registration operation for generating the TPM user key.

6. The system of claim 1, the BIOS configured to identify the stored TPM user key corresponding to the user based on the user identification data provided by the user.

7. The system of claim 1, the BIOS configured to identify the TPM user key corresponding to the user based on the user identification data selected by the user.

8. The system of claim 1, the BIOS configured to transfer the TPM authentication data to the TPM for generation of the TPM user key.

9. The system of claim 1, the BIOS configured to initiate the boot process in response to validation of the subsequent TPM authentication data by the TPM.

10. The system of claim 1, the BIOS configured to request the TPM authentication data from the user.

11. A computer security method, comprising:
registering one or more users for performing a secure boot process on a computer, the registering comprising:
receiving a first user identification data and a trusted platform module (TPM) authentication data from a user;
generating, by a TPM, a TPM user key as a function of the TPM authentication data; and
storing and associating in a memory the TPM user key generated by the TPM with the first user identification data corresponding to the user;
during a boot process on the computer:
receiving a second user identification data and a second TPM authentication data from the user;
verifying if the second TPM authentication data corresponds to the TPM user key associated with the first user identification data stored in the memory; and
if the second TPM authentication data corresponds to the TPM user key, the BIOS allows the boot process to perform.

12. The method of claim 11, further comprising requesting generation of the TPM user key by the TPM.

13. The method of claim 11, further comprising identifying the TPM user key based on user identification data provided by the user.

14. The method of claim 11, further comprising identifying the TPM user key based on user identification data selected by the user.

15. The method of claim 11, further comprising transferring the TPM authentication data to the TPM for generation of the TPM user key.

16. The method of claim 11, further comprising requesting the TPM authentication data from the user.

17. The method of claim 11 further comprising, terminating the boot process when the second TPM authentication data does not correspond to the TPM user key.

18. The method of claim 11, wherein storing the TPM user key comprises storing the user key on a basic input/output system (BIOS).

19. A computer security method, comprising:
performing a registration operation to generate a trusted platform module (TPM) user key corresponding to a user via a TPM where the TPM user key is associated with a first user identification data in a memory, and where the TPM user key is generated from a first TPM authentication data input from the user; and
controlling a subsequent boot process performed by a basic input/output system (BIOS) via the TPM using the TPM user key, the subsequent boot process comprising:
receiving a second user identification data and a second TPM authentication data from the user;
retrieving the TPM user key associated with the first user identification data stored in the memory;
verifying whether the second TPM authentication data corresponds to the TPM user key; and
if the second TPM authentication data corresponds to the TPM user key associated with the first user identification data, allowing the boot process to perform.

20. The method of claim 19, wherein performing the registration operation comprises transferring the first TPM authentication data received from the user to the TPM.

21. The method of claim 19 further comprising, requesting the second TPM authentication data from the user for initiating the boot process.

22. The method of claim 19, wherein the first user identification data includes a username and password, and the first TPM authentication data includes a TPM password.

23. The method of claim 19, wherein controlling a subsequent boot process comprises requesting validation of the second TPM authentication data corresponding to the user by the TPM using the TPM user key.

24. The method of claim 19 further comprising, prompting the user to provide the second user identification data to identify the TPM user key associated with the user.

25. The method of claim 19, wherein performing a registration operation comprises requesting a username and password from the user.

26. The method of claim 19, wherein performing a registration operation comprises requesting the first TPM authentication data from the user.

27. The method of claim 19, further comprising storing the TPM user key on the BIOS.

28. A computer security system, comprising:
a trusted platform module (TPM) to at least generate a user key upon a request;
a registration module to register users for performing a secure boot process using the TPM, the registration module configured to:
receive a user identification data and a TPM authentication data from a user;
request the TMP to generate a TPM user key using the TPM authentication data; and
store and associate the TPM user key with the user identification data; and a boot module adapted to control a subsequent boot process by:
receiving a subsequent user identification data and a subsequent TPM authentication data from the user for initiating the boot process,
requesting validation of the subsequent TPM authentication data from the TPM by determining whether the subsequent TPM authentication data corresponds to the TPM user key; and
if the subsequent TPM authentication data corresponds to the TPM user key associated with the user identification data, the boot module allows the boot process to perform.

29. The system of claim 28, the registration module adapted to transfer TPM authentication data received from the user to the TPM for generating the TPM user key.

30. The system of claim 28, the registration module adapted to facilitate storage of the TPM user key in a basic input/output system (BIOS).

31. The system of claim 28, the boot module adapted to transfer the TPM user key and TPM authentication data corresponding to the user to the TPM for validation of the subsequent TPM authentication data using the TPM user key.

32. The system of claim 28, the boot module adapted to request TPM authentication data from the user for the subsequent boot process.

33. The system of claim 28, the boot module adapted to retrieve the TPM user key from a memory based on user identification data provided by the user.

34. The system of claim 28, the boot module adapted to retrieve the TPM user key from a memory based on user identification data selected by the user.

35. The system of claim 28, the registration module adapted to request TPM authentication data from the user during the registration operation.

* * * * *